(12) United States Patent
Matsuura et al.

(10) Patent No.: US 7,643,376 B2
(45) Date of Patent: Jan. 5, 2010

(54) DIRECTION DETECTING DEVICE AND DIRECTION DETECTING SYSTEM

(75) Inventors: Mitsuyasu Matsuura, Chiryu (JP); Toshiki Isogai, Nagoya (JP); Makiko Sugiura, Hekinan (JP); Toshihiro Hattori, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 12/285,715

(22) Filed: Oct. 14, 2008

(65) Prior Publication Data

US 2009/0135672 A1 May 28, 2009

(30) Foreign Application Priority Data

Nov. 27, 2007 (JP) .............................. 2007-305896

(51) Int. Cl.
 *G01S 15/00* (2006.01)
(52) U.S. Cl. ......................................... 367/100; 367/99
(58) Field of Classification Search .................. 367/99, 367/100; 375/142
 See application file for complete search history.

(56) References Cited

U.S. PATENT DOCUMENTS 5,517,689 A * 5/1996 Hayashihara ................ 455/205

2005/0135190 A1 6/2005 Katou et al.
2005/0275583 A1 * 12/2005 Mikami et al. .............. 342/109

FOREIGN PATENT DOCUMENTS

| JP | A-H6-160414 | 6/1994 |
| JP | A-2002-341005 | 11/2002 |
| JP | A-2004-219428 | 8/2004 |
| JP | A-2006-343309 | 12/2006 |

* cited by examiner

*Primary Examiner*—Ian J Lobo
(74) *Attorney, Agent, or Firm*—Posz Law Group, PLC

(57) ABSTRACT

In a direction detecting device, a transmitting wave generator encodes a transmitting signal with a code having a high autocorrelation so as to generate a transmitting wave. A transmitter transmits the transmitting wave and a plurality of receiver elements receives a reflected wave reflected by an object. A direction calculating unit calculates a direction of the object based on a phase difference between a correlation value calculated based on the reflected wave received by one of the receiver elements and a correlation value calculated based on the reflected wave received by another one of the receiver elements, a distance between the one of the receiver elements and the another one of the receiver elements, and a wavelength of the transmitting wave.

11 Claims, 5 Drawing Sheets

DIRECTION DETECTING DEVICE AND DIRECTION DETECTING SYSTEM

CROSS REFERENCE TO RELATED APPLICATIONS

The present application is based on and claims priority to Japanese Patent Application No. 2007-305896 filed on Nov. 27, 2007, the contents of which are incorporated in their entirety herein by reference.

BACKGROUND OF THE INVENTION

1. Field of the Invention

The present invention relates to a direction detecting device and a direction detecting system for detecting a direction of an object.

2. Description of the Related Art

In a conventional direction detecting device, a transmitting signal is encoded with a code having a high autocorrelation for generating a transmitting wave. The transmitting wave is transmitted by a transmitter means and a reflected wave reflected by an object is received by a receiver means. The received reflected wave is orthogonally demodulated for generating a received signal. Then, a correlation between the transmitting signal and the received signal is calculated, that is, a pulse compression is performed. Thereby, a signal-to-noise ration (S/N ratio) is improved and a distance from the direction detecting device to the object is detected by using absolute value information of a result of the correlation calculation, as described, for example, in US 2005/0135190 A (corresponding to JP-A-2005-249770).

A conventional method of detecting a direction of an object by using absolute value information of a received signal includes a triangulation method. In the triangulation method, a reflected wave reflected by the object is received by a plurality of receiver elements, and a difference in receiving times of the received signals of the receiver elements is used for detecting the distance of the object. Thus, in the triangulation method, the direction detecting device is required to detect the difference in the receiving times with a high degree of accuracy. The difference in the receiving times depends on a distance between the receiver elements. When the distance between the receiver elements decreases, the difference in the receiving times also decreases. Thus, the direction detecting device is difficult to detect the direction of the object with a high degree of accuracy.

SUMMARY OF THE INVENTION

In view of the foregoing problems, it is an object of the present invention to provide a direction detecting device. Another object of the invention is to provide a direction detecting system.

According to an aspect of the invention, a direction detecting device includes a transmitting wave generator, a transmitter, a receiver, an orthogonal demodulator, a correlation-value calculating unit, a phase-difference calculating unit, and a direction calculating unit. The transmitting wave generator encodes a transmitting signal with a code having a high autocorrelation so as to generate a transmitting wave. The transmitter transmits the transmitting wave. The receiver includes a plurality of receiver elements for receiving a reflected wave reflected by an object. The orthogonal demodulator orthogonally demodulates the reflected wave received by each of the receiver elements so as to generate a received signal. The correlation-value calculating unit calculates a complex correlation value between each of the receiving signals and the transmitting signal using the code. The phase-difference calculating unit calculates a phase difference between the complex correlation value calculated based on the reflected wave received by one of the receiver elements and the complex correlation value calculated based on the reflected wave received by another one of the receiver elements. The direction calculating unit calculating a direction of the object based on the phase difference, a distance between the one of the plurality of receiver elements and the another one of the receiver elements, and a wavelength of the transmitting wave. The present direction detecting device can detect the direction of the object with a high degree of accuracy.

According to another aspect of the invention, a direction detecting system includes a plurality of direction detecting devices. Each of the plurality of direction detecting devices includes a transmitting wave generator, a transmitter, a receiver, an orthogonal demodulator, a correlation-value calculating unit, a phase-difference calculating unit, and a direction calculating unit. Each of the transmitting wave generators encodes a transmitting signal with a code having a high autocorrelation so as to generate a transmitting wave. Each of the transmitters transmits the transmitting wave. Each of the receivers includes a plurality of receiver elements for receiving a reflected wave reflected by an object. Each of the orthogonal demodulators orthogonally demodulates the reflected wave received by each of the receiver elements so as to generate a received signal. Each of the correlation-value calculating units calculates a complex correlation value between each of the receiving signals and the transmitting signal using the code. Each of the phase-difference calculating units calculates a phase difference between the complex correlation value calculated based on the reflected wave received by one of the receiver elements and the complex correlation value calculated based on the reflected wave received by another one of the receiver elements. Each of the direction calculating units calculating a direction of the object based on the phase difference, a distance between the one of the plurality of receiver elements and the another one of the receiver elements, and a wavelength of the transmitting wave. Each of the correlation-value calculating units is capable of calculating the complex correlation values with all the codes used by the transmitting wave generators for generating the transmitting wave and each of the correlation-value calculating unit calculates the complex correlation values with one of the codes. The present direction detecting system can provide a wide detecting area.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

Figure 1:
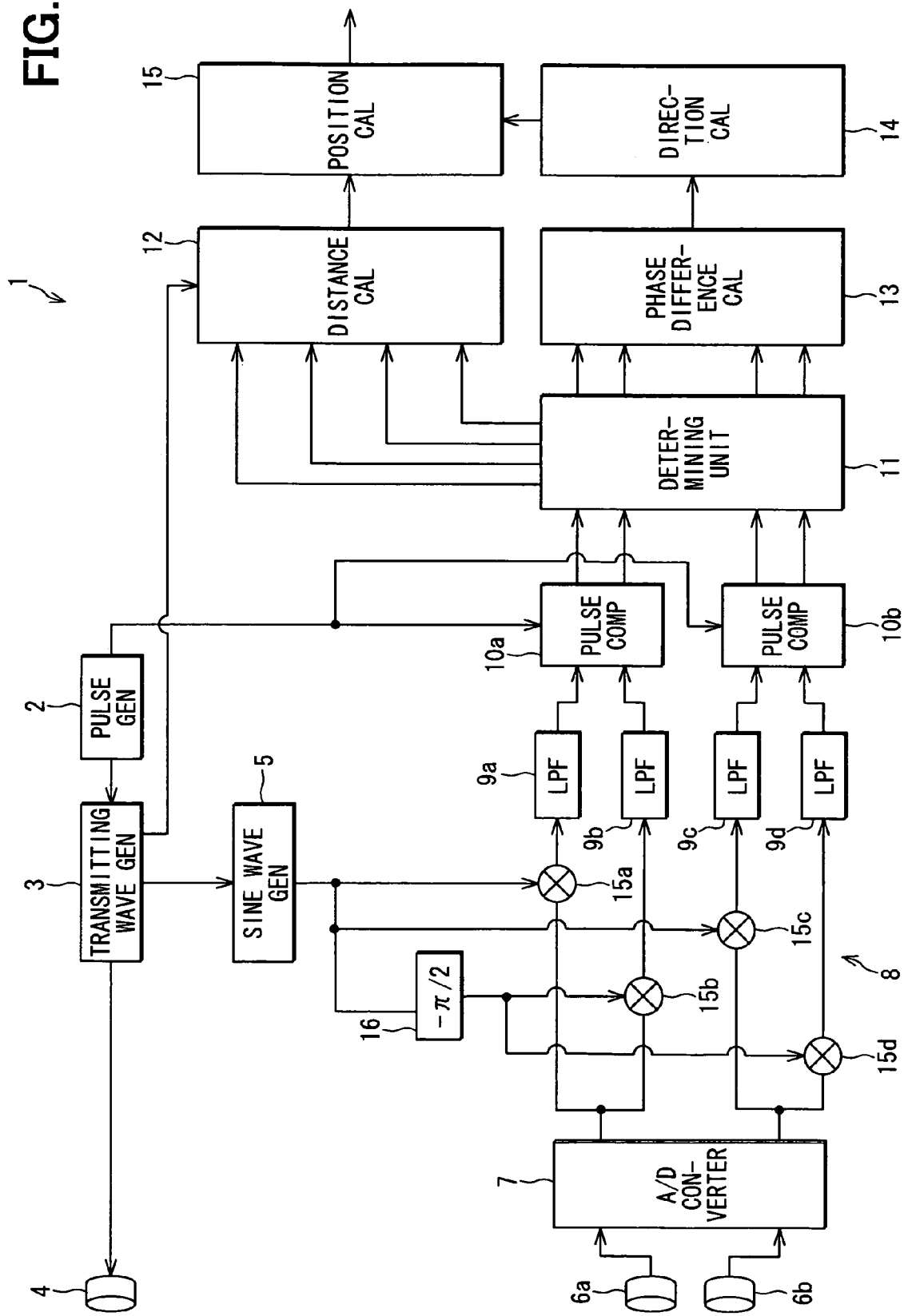
FIG. 1 is a block diagram illustrating a position detecting apparatus according to an exemplary embodiment of the invention.

A direction detecting device according to an exemplary embodiment of the invention can be suitably used for a position detecting apparatus 1 for detecting a position of an object. The position detecting apparatus 1 can be used for a ultrasonic wave sonar provided in a vehicle for detecting an obstacle around the vehicle. As illustrated in FIG. 1, the position detecting apparatus 1 includes a pulse generator 2, a transmitting wave generator 3, a transmitting microphone 4, a sine wave generator 5, a first receiving microphone 6a, a second receiving microphone 6b, an analog-digital converter (A/D converter) 7, an orthogonal demodulator 8, first to fourth low-pass filters (LPF) 9a-9d, a first pulse compressor 10a, a second pulse compressor 10b, a determining unit 11, a distance calculating unit 12, a phase-difference calculating unit 13, a direction calculating unit 14, and a position calculating unit 15.

The pulse generator 2 generates a transmitting signal (pulse signal) including a pulse train provided by a plurality of pulses and outputs the transmitting signal to the transmitting wave generator 3 and the pulse compressors 10a and 10b. For example, the transmitting signal includes 7 bit Barker code string. The transmitting wave generator 3 receives the transmitting signal from the pulse generator 2 and digital phase code modulates the received transmitting signal. The transmitting wave generator 3 modulates a phase with each pulse train in accordance with the code string provided by a plurality of codes and outputs the modulated signals as a transmitting wave to the transmitting microphone 4 and the sine wave generator 5.

The transmitting microphone 4 is a resonance microphone and includes a piezoelectric element and a cover that covers the piezoelectric element. By driving the piezoelectric element, the cover resonates. When the transmitting microphone 4 receives the transmitting wave from the transmitting wave generator 3, the received transmitting wave is transmitted to the piezoelectric element as a modulated wave. Thereby, the piezoelectric element is driven and the cover resonates so as to transmit the transmitting wave to an outside of the position detecting apparatus 1. When the sine wave generator 5 receives the transmitting wave from the transmitting wave generator 3, the sine wave generator 5 generates a sine wave having an angular frequency synchronized with an angular frequency of the received transmitting wave. Then, the sine wave generator 5 outputs the sine wave to the orthogonal demodulator 8. The orthogonal demodulator 8 includes a phase shifter ($-\pi/2$) 16 and first to fourth multipliers 15a-15d. In the present case, the sine wave generator 5 outputs the sine wave to the first multiplier 15a and the third multiplier 15c without shifting phase. The phase shifter 16 shifts the phase of the sine wave by $\pi/2$ and outputs the phase-shifted wave to the second multiplier 15b and the fourth multiplier 15d.

Each of the receiving microphones 6a and 6b is similar to the transmitting microphone 4. That is, each of the receiving microphones 6a and 6b is a resonance microphone and includes a piezoelectric element and a cover that covers the piezoelectric element. By driving the piezoelectric element, the cover resonates. When the transmitting wave transmitted by the transmitting microphone 4 is reflected by an object and each of the receiving microphones 6a and 6b receives the reflected wave, each of the piezoelectric elements outputs a received signal to the A/D converter 7. When the A/D converter 7 receives the received signal from the first receiving microphone 6a, the AND converter 7 samples the received signal at a sampling frequency and converts the received signal into a digital signal. Then, the A/D converter 7 outputs the converted received signal to the first multiplier 15a and the second multiplier 15b. For example, the sampling frequency is several times of a frequency of the transmitting wave. When the A/D converter 7 receives the received signal from the second receiving microphone 6b, the A/D converter 7 samples the received signal at the sampling frequency and converts the received signal into a digital signal. Then, the A/D converter 7 outputs the converted received signal to the third multiplier 15c and the fourth multiplier 15d.

When the first multiplier 15a receives the received signal from the A/D converter 7 and receives the sine wave from the sine wave generator 5, the first multiplier 15a multiplies the received signal by the sine wave. When the second multiplier 15b receives the received signal from the A/D converter 7 and receives the sine wave that is phase-shifted by the phase shifter 16, the second multiplier 15b multiplies the received signal by the phase-shifted sine wave. That is, the received signal that is generated by receiving the reflected wave at the first receiving microphone 6a is divided into an in-phase component (I-component) and an orthogonal component (Q-component). Similarly, when the third multiplier 15c receives the received signal from the A/D converter 7 and receives the sine wave from the sine wave generator 5, the third multiplier 15c multiplies the received signal by the sine wave. When the fourth multiplier 15d receives the received signal from the A/D converter 7 and receives the sine wave that is phase-shifted by the phase shifter 16, the fourth multiplier 15d multiplies the received signal by the phase-shifted sine wave. That is, the received signal that is generated by receiving the reflected wave at the second receiving microphone 6b is divided into an in-phase component (I-component) and an orthogonal component (Q-component).

When the first LPF 9a receives the I-component signal from the first multiplier 15a, the first LPF 9a removes a high-frequency component from the I-component signal and outputs the I-component signal without the high-frequency component to the first pulse compressor 10a. When the second LPF 9b receives the Q-component signal from the second multiplier 15b, the second LPF 9b removes a high-frequency component from the Q-component signal and outputs the Q-component signal without the high-frequency component to the first pulse compressor 10a. Similarly, when the third LPF 9c receives the I-component signal from the third multiplier 15c, the third LPF 9c removes a high-frequency component from the I-component signal and outputs the I-component signal without the high-frequency component to the second pulse compressor 10b. When the fourth LPF 9d receives the Q-component signal from the fourth multiplier 15d, the fourth LPF 9d removes a high-frequency component from the Q-component signal and outputs the Q-component signal without the high-frequency component to the second pulse compressor 10b.

The first pulse compressor 10a includes a correlation filter. When the first pulse compressor 10a receives the I-component signal from the first LPF 9a and receives the Q-component signal from the second LPF 9b, the first pulse compressor 10a multiplies the I-component signal and the Q-component signal by the code of the transmitting signal from the pulse generator 2 at different times. In addition, the first pulse compressor 10a operates a difference vector of the multiplied result and a previous multiplied result with each code and add ups the operated difference vector. Furthermore, the first pulse compressor 10a averages the added result and calculates a correlation value of the received signal generated at the first receiving microphone 6a and the transmitting signal with each component of the I-component and the Q-component. Then, the first pulse compressor 10a outputs a complex correlation value that represents the calculated result to the determining unit 11.

Similarly, the second pulse compressor 10b includes a correlation filter. When the second pulse compressor 10b receives the I-component signal from the third LPF 9c and receives the Q-component signal from the fourth LPF 9d, the second pulse compressor 10b multiplies the I-component signal and the Q-component signal by the code of the transmitting signal from the pulse generator 2 at different times. In addition, the second pulse compressor 10b operates a difference vector of the multiplied result and a previous multiplied result with each code and add ups the operated difference vector. Furthermore, the second pulse compressor 10b averages the added result and calculates a correlation value of the received signal generated at the second receiving microphone 6b and the transmitting signal with each component of the I-component and the Q-component. Then, the second pulse compressor 10b outputs a complex correlation value that represents the calculated result to the determining unit 11.

When the determining unit 11 receives the complex correlation values from the pulse compressors 10a and 10b, the determining unit 11 calculates amplitude of the received signals. When the determining unit 11 determines that the amplitude is larger than or equal to a threshold value, the determining unit 11 determines receiving times when the receiving microphones 6a and 6b receive the reflected wave. Then, the determining unit 11 outputs the receiving times of the reflected wave to the distance calculating unit 12 and the phase-difference calculating unit 13. When the amplitude of the received signal is calculated, the complex correlation value of a predetermined one of the receiving microphones 6a and 6b may be used or a composition of the complex correlation values of the receiving microphones 6a and 6b may also be used.

When the distance calculating unit 12 receives a transmitting time from the transmitting wave generator 3 and receives the receiving times from the determining unit 11, the distance calculating unit 12 calculates a distance to the object based on a difference between the transmitting time and the receiving times. The distance calculating unit 12 outputs the calculated distance to the position calculating unit 15.

When the phase-difference calculating unit 13 receives the receiving times from the determining unit 11, the phase-difference calculating unit 13 calculates a phase difference between a phase of the reflected wave at the receiving time of the first receiving microphone 6a and a phase of the reflected wave at the receiving time of the second receiving microphone 6b. The phase-difference calculating unit 13 outputs the phase difference to the direction calculating unit 14. When the direction calculating unit 14 receives the phase difference from the phase-difference calculating unit 13, the direction calculating unit 14 calculates a direction of the object based on the phase difference, a distance between the first receiving microphone 6a and the second receiving microphone 6b and a wavelength of the transmitting wave. The direction calculating unit 14 outputs the calculated direction to the position calculating unit 15.

Figure 2:
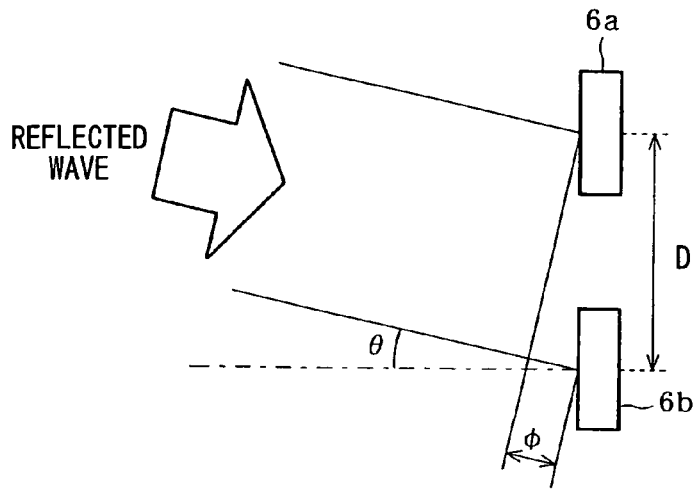
FIG. 2 is a schematic diagram illustrating relationships among a phase difference ($\phi$), a distance (D) between receiving microphones, and a direction ($\theta$) of an object.

Referring to FIG. 2, the phase difference ($\phi$) between the phase of the reflected wave at the receiving time of the first receiving microphone 6a and the phase of the reflected wave at the receiving time of the second receiving microphone 6b, the distance (D) between the first receiving microphone 6a and the second receiving microphone 6b, and the wavelength ($\lambda$) of the transmitting wave and the direction ($\theta$) of the object have relationships expressed by the following formulas. Thus, the direction ($\theta$) can be calculated.

$$2\pi/\lambda \cdot D \cdot \sin\theta = \phi$$

$$\theta = \arcsin(\lambda \cdot \phi / 2\pi \cdot D)$$

When the position calculating unit 15 receives the distance from the distance calculating unit 12 and receives the direction from the direction calculating unit 14, the position calculating unit 15 calculates a position of the object based on the distance and the direction. The position calculating unit 15 outputs the position to an external device.

Figure 3:
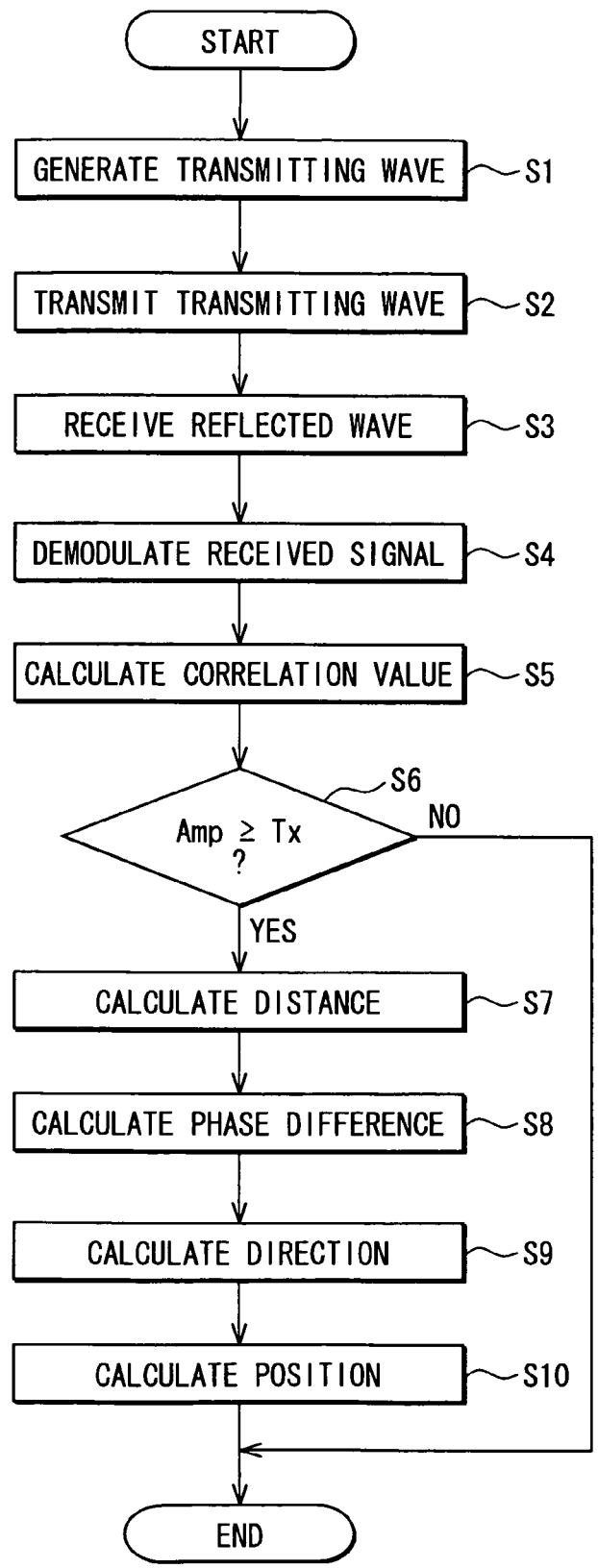
FIG. 3 is a flow diagram illustrating an exemplary process for detecting a position of the object.

An exemplary process of detecting a position of the object by the position detecting apparatus 1 will now be described with reference to FIG. 3. At first, the transmitting wave generator 3 generates the transmitting wave at S1, and the transmitting wave is transmitted from the transmitting microphone 4 at S2.

When the receiving microphones 6a and 6b receive the reflected wave, which is transmitted from the transmitting microphone 4 and is reflected by the object, at S3, the A/D converter 7 converts the received signals, which correspond to the reflected wave, into digital signals and the orthogonal demodulator 8 orthogonally demodulates the converted received signals at S4. Then, each of the LPFs 9a-9d removes the high frequency component in the corresponding one of the demodulated received signals, and each of the pulse compressors 10a and 10b calculates the correlation value between corresponding one the received signals and the transmitting signal at S5.

Next, the determining unit 11 calculates the amplitude of the received signals based on the correlation values and determines whether the amplitude (Amp) is greater than or equal to the threshold value (Tx) at S6. When the determining unit 11 determines that the amplitude is greater than or equal to the threshold value, which corresponds to "YES" at S6, the distance calculating unit 12 calculates the distance to the object based on the difference between the transmitting time of the transmitting wave and the receiving times of the reflected wave at S7.

Next, the phase-difference calculating unit 13 calculates the phase difference between the phase at the receiving time when the first receiving microphone 6a receives the reflected wave and the phase at the receiving time when the second receiving microphone 6b receives the reflected wave at S8. The direction calculating unit 14 calculates the direction of the object based on the phase difference, the distance between the first receiving microphone 6a and the second receiving microphone 6b, and the wavelength of the transmitting wave at S9. At S10, the position calculating unit 15 calculates the position of the object based on the distance and the direction. When the determining unit 11 determines that the amplitude is less than the threshold value, which corresponds to "NO" at S6, the process of detecting the position of the object ends.

Figure 4:
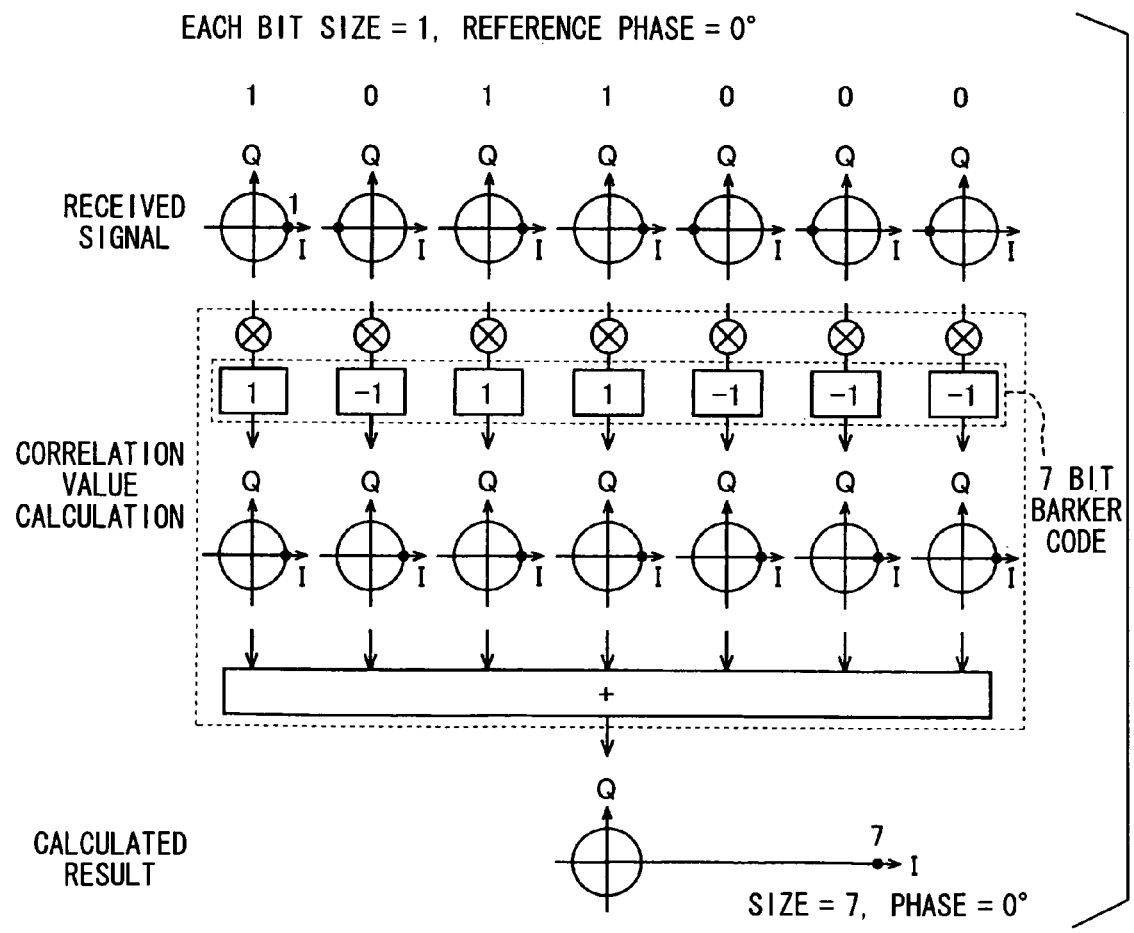
FIG. 4 is a schematic diagram illustrating a principle that a phase difference is kept at a pulse compression.
Figure 5:
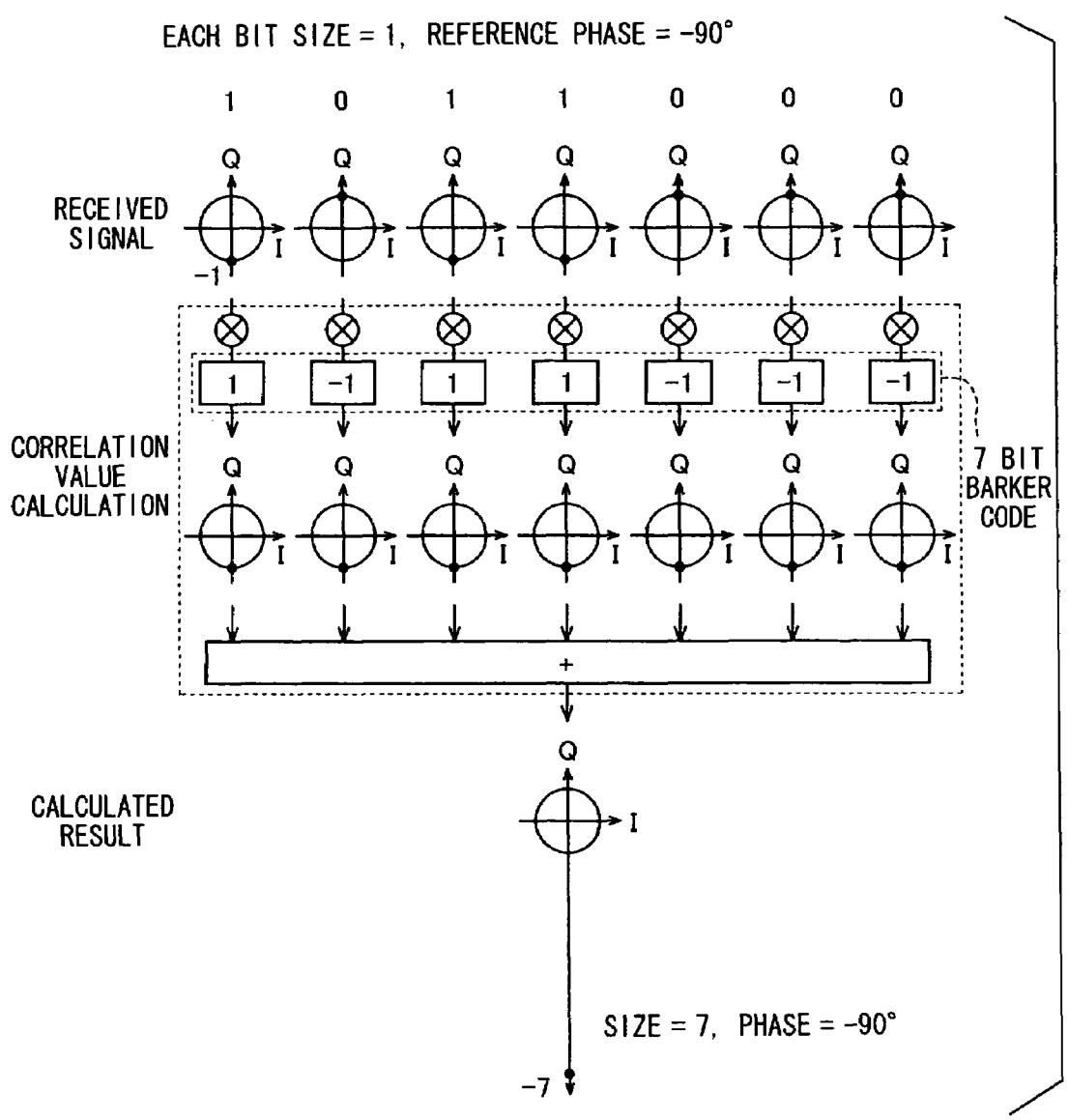
FIG. 5 is a schematic diagram illustrating a principle that the phase difference is kept at the pulse compression.

The phase difference does not change between before and after the correlation-value calculation at the pulse compressors 10a and 10b. For example, when the first receiving microphone 6a and the second receiving microphone 6b receive the reflective wave that is encoded into the 7 bit Barker code (code string: 1011000) and the phases are different by 90 degrees, the phases of the correlation values output from the first pulse compressor 10a and the second pulse compressor 10b are also different by 90 degrees, as illustrated in FIG. 4 and FIG. 5. That is, although a size of the reflected signals increases with code length (i.e., 7 times in the present case), the phase difference does not change between before and after the correlation-value calculation.

Figure 6A:
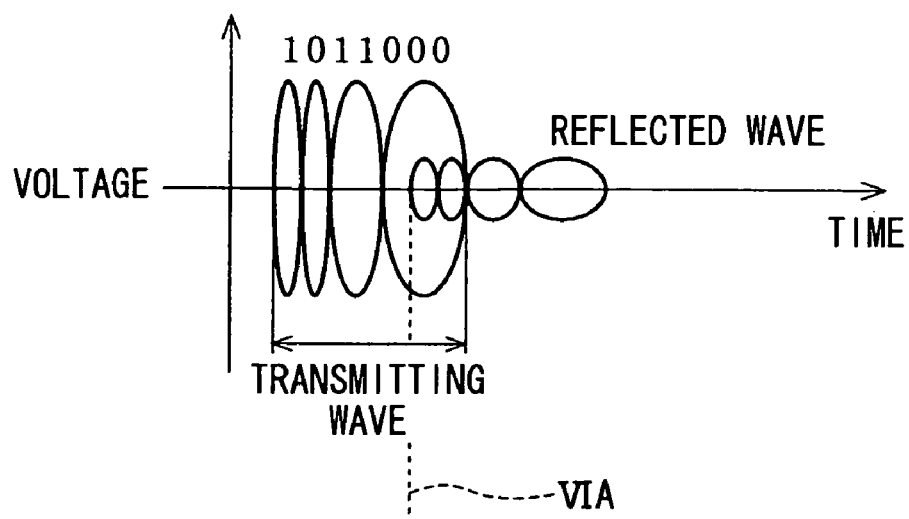
FIG. 6A is a graph illustrating a temporal relationship between a transmitting wave and a reflective wave when a digital phase code modulation is performed.

The transmitting wave generator 3 may have a first time period and a second time period. During the first time period, the transmitting wave generator 3 digital phase code modulates the transmitting signal from the pulse generator 2, and outputs the modulated transmitting signal as the transmitting wave to the transmitting microphone 4 and the sine wave generator 5. During the second time period, the transmitting wave generator 3 outputs the transmitting signal from the pulse generator 2 as the transmitting wave to the transmitting microphone 4 and the sine wave generator 5 without the digital phase code modulation. When the receiving microphones 6a and 6b are arranged adjacent to the transmitting microphone 4, the transmitting wave may enter the receiving microphones 6a and 6b. In a state where the distance to the object is long, even if the transmitting signal is digital phase code modulated and the modulated transmitting signal is transmitted as the transmitting wave, the transmitting wave does not overlap with the reflected wave. However, in a state where the distance to the object is short, if the transmitting signal is digital phase code modulated and the modulated transmitting signal is transmitted as the transmitting wave, the transmitting wave has a high possibility to overlap with the reflected wave, as illustrated in FIG. 6A. In the present case, the position detecting apparatus 1 is difficult to detect the position of the object.

Figure 6B:
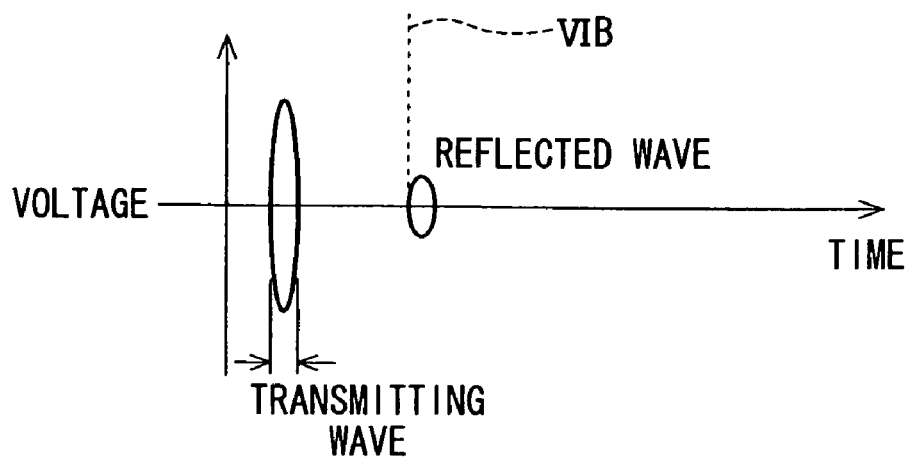
FIG. 6B is a graph illustrating the temporal relationship between the transmitting wave and the reflective wave when the digital phase code modulation is not performed.

In contrast, if the transmitting signal is transmitted as the transmitting wave without the digital phase code modulation, the transmitting wave has a low possibility to overlap with the reflected wave, as illustrated in FIG. 6B. In FIG. 6A and FIG. 6B, each of the broken lines VIA and VIB shows a time when the reflected wave is received, and the broken lines VIA and VIA are substantially same time. If the transmitting wave generator 3 is configured to switch the first time period and the second time period with a predetermined short cycle, the position detecting apparatus 1 can detect the position of the object regardless of the distance to the object. In this case, the transmitting signal is encoded by a code having a high autocorrelation such as a Barker code and a maximum length sequence (M-sequence).

That is, when the transmitting wave generator 3 encodes the transmitting signal with the code having the high autocorrelation and outputs the encoded transmitting signal as the transmitting wave, the position detecting apparatus 1 can detect the direction of the object at a long distance from the position detecting apparatus 1 with a high degree of accuracy. When the transmitting wave generator 3 outputs the transmitting signal as the transmitting wave without encoding, the transmitting time of the transmitting signal can be short, the position detecting apparatus 1 can detect the reflected wave without an affect of the transmitting signal within a short time, and thereby the position detecting apparatus 1 can detect the object at a short distance from the position detecting apparatus 1. Thus, when the transmitting wave generator 3 is configured to switch the first time period and the second time period with the predetermined short cycle, the position detecting apparatus 1 can detect the position of the object regardless of the distance to the object.

The transmitting signal may also be encoded with a code selected from a plurality of codes each having a same code length and a different code string for generating the transmitting wave. In this case, even if another position detecting apparatus is located adjacent to the position detecting apparatus 1, the position detecting apparatus 1 can reduce a malfunction due to detecting a transmitting wave from the another position detecting apparatus by using a code different from the another position detecting apparatus. The transmitting signal may also be encoded with a code other than a code that provides a maximum correlation value between the transmitting wave and an interfering wave around the position detecting apparatus 1. The transmitting signal may also be encoded with a code which provides a minimum correlation value between the transmitting wave and the interfering wave. In these cases, even if another apparatus, e.g., an ultrasonic wave sonar or a position detecting apparatus is located adjacent to the position detecting apparatus 1, a malfunction of the position detecting apparatus 1 due to detecting a transmitting wave or a reflected wave of the another apparatus can be reduced. In these cases, the transmitting signal is encoded with a code that generates a plurality of code string each having a same code length. For example, the code may be the M-sequence, a Gold code, or an orthogonal code.

In the above-described exemplary embodiment, a receiver is provided by the first receiving microphone 6a and the second receiving microphone 6b, as an example. The receiver may include four receiving microphones that are arranged in a lattice shape. In this case, a phase difference between correlation values of two receiving microphones that are arranged in a horizontal direction is calculated. Then, a direction of the object in the horizontal direction is calculated based on the phase difference of the correlation values of the two receiving microphones arranged in the horizontal direction, a distance between the two receiving microphones, and the wavelength of the transmitting wave. Next, a phase difference between correlation values of two receiving microphones that are arranged in a vertical direction is calculated. Then, a direction of the object in the vertical direction is calculated based on the phase difference of the correlation values of the two receiving microphones arranged in the vertical direction, a distance between the two receiving microphones, and the wavelength of the transmitting wave. Thereby, a three-dimensional position of the object can be calculated.

The receiver may also include three receiving microphones arranged in an approximately triangle shape. Also in this case, a phase difference between correlation values of two receiving microphones that are arranged in a horizontal direction is calculated. Then, a direction of the object in the horizontal direction is calculated based on the phase difference of the correlation values of the two receiving microphones arranged in the horizontal direction, a distance between the two receiving microphones, and the wavelength of the transmitting wave. Next, a phase difference between correlation values of two receiving microphones that are arranged in a vertical direction is calculated. Then, a direction of the object in the vertical direction is calculated based on the phase difference of the correlation values of the two receiving microphones arranged in the vertical direction, a distance between the two receiving microphones, and the wavelength of the transmitting wave. Thereby, the three-dimensional position of the object can be calculated.

A plurality of the position detecting apparatus 1 that configure a position detecting system may be disposed, for example, at a bumper of the vehicle. In the plurality of the position detecting apparatus 1, if the pulse compressors 10a and 10b are configured to detect the correlation values with all the codes used for generating the transmitting wave, a reflected wave that is transmitted from one of the position detecting apparatuses 1 and is reflected by an object can be detected by another one of the position detecting apparatuses 1. Thus, a detecting area increases. For example, four position detecting apparatuses 1a-1d are disposed. The position detecting apparatus 1a transmits a transmitting wave encoded with a code A, the position detecting apparatus 1b transmits a transmitting wave encoded with a code B, the position detecting apparatus 1c transmits a transmitting wave encoded with a code C, the position detecting apparatus 1d transmits a transmitting wave encoded with a code D. Each of the pulse compressors 10a and 10b in the position detecting apparatuses 1a-1d can calculate the correlation values by using all of the codes A-D. Thus, by detecting the correlation values with one of the codes A-D, position detecting apparatuses 1a-1d can have complemented relationships. As a result, the position detecting system can have a wide detecting area.

As described above, in the position detecting apparatus 1 according to the exemplary embodiment, the transmitting microphone 4 transmits the transmitting wave that is digital phase code modulated. The receiving microphones 6a and 6b receive the reflected wave. The pulse compressors 10a and 10b calculates a complex correlation values using the code. The phase-difference calculating unit 13 calculates the phase difference between the correlation values. The direction calculating unit 14 calculates the direction of the object based on the phase difference, the distance between the receiving microphones 6a and 6b, and the wavelength of the transmitting wave. Because the calculations of the correlation values are linear operations, the phase difference does not change between before and after the calculation. Thus, position detecting apparatus 1 is not required to take into consideration various issue due to a time difference between the received signals of the receiving microphones 6a and 6b. As a result, the position detecting apparatus 1 can detect the direction of the object with a high degree of accuracy while improving the S/N ratio regardless of the distance between the receiving microphones 6a and 6b.

Other Embodiments

Although the present invention has been fully described in connection with the preferred embodiments thereof with reference to the accompanying drawings, it is to be noted that various changes and modifications will become apparent to those skilled in the art.

In the above-described exemplary embodiment, the transmitting microphone 4 and the receiving microphones 6a and 6b are provided separately, as an example. Alternatively, a transmitting/receiving microphone that has both functions of a sending microphone and a receiving microphone may be provided.

What is claimed is:

1. A direction detecting device comprising:
a transmitting wave generator for encoding a transmitting signal with a code having a high autocorrelation so as to generate a transmitting wave;
a transmitter for transmitting the transmitting wave;
a receiver including a plurality of receiver elements for receiving a reflected wave reflected by an object;
an orthogonal demodulator for orthogonally demodulating the reflected wave received by each of the receiver elements so as to generate a received signal;
a correlation-value calculating unit for calculating a complex correlation value between each of the receiving signals and the transmitting signal using the code;
a phase-difference calculating unit for calculating a phase difference between the complex correlation value calculated based on the reflected wave received by one of the receiver elements and the complex correlation value calculated based on the reflected wave received by another one of the receiver elements; and
a direction calculating unit for calculating a direction of the object based on the phase difference, a distance between the one of the plurality of receiver elements and the another one of the receiver elements, and a wavelength of the transmitting wave.

2. The direction detecting device according to claim 1, wherein:
the transmitting wave generator switches a first time period and a second time period;
the transmitting wave generator generates the transmitting wave by encoding the transmitting signal with the code during the first time period; and
the transmitting wave generator generates the transmitting wave without encoding the transmitting signal with the code during the second time period.

3. The direction detecting device according to claim 1, wherein
the code is one of a Barker code, a maximum length sequence, a Gold code, and an orthogonal code.

4. The direction detecting device according to claim 1, wherein:
the transmitting wave generator is capable of encoding the transmitting signal with a plurality of codes;
each of the plurality of code has a same code length and a different code string; and
the transmitting wave generator encodes the transmitting signal with one of the plurality of codes so as to generate the transmitting wave.

5. The direction detecting device according to claim 4, wherein
the code is one of a maximum length sequence, a Gold code, and an orthogonal code.

6. The direction detecting device according to claim 1, wherein:
the code provides a minimum correlation between the transmitting wave and an interfering wave; or
the code provides a predetermined correlation between the transmitting wave and the interfering wave; and
the predetermined correlation is other than a maximum correlation.

7. The direction detecting device according to claim 6, wherein
the code is one of a maximum length sequence, a Gold code, and an orthogonal code.

8. The direction detecting device according to claim 1, wherein:
the receiver includes at least four receiver elements arranged in a lattice shape;
the phase-difference calculating unit calculates a phase difference between correlation values calculated by the correlation-value calculating unit based on the reflected wave received by the receiver elements arranged in a horizontal direction;
the phase-difference calculating unit further calculates a phase difference between correlation values calculated by the correlation-value calculating unit based on the reflected wave received by the receiver elements arranged in a vertical direction;
the direction calculating unit calculates a direction of the object in the horizontal direction based on the phase-difference between the receiver elements arranged in the horizontal direction, a distance between the receiver elements arranged in the horizontal direction, and the wavelength of the transmitting wave; and the direction calculating unit further calculates a direction of the object in the vertical direction based on the phase-difference between the receiver elements arranged in the vertical direction, a distance between the receiver elements arranged in the vertical direction, and the wavelength of the transmitting wave.

9. The direction detecting device according to claim 1, wherein:

the receiver includes at least three receiver elements arranged in a approximately triangle shape;

the phase-difference calculating unit calculates a phase difference between correlation values calculated by the correlation-value calculating unit based on the reflected wave received by the receiver elements arranged in a horizontal direction;

the phase-difference calculating unit further calculates a phase difference between correlation values calculated by the correlation-value calculating unit based on the reflected wave received by the receiver elements arranged in a vertical direction;

the direction calculating unit calculates a direction of the object in the horizontal direction based on the phase-difference between the receiver elements arranged in the horizontal direction, a distance between the receiver elements arranged in the horizontal direction, and the wavelength of the transmitting wave; and the direction calculating unit further calculates a direction of the object in the vertical direction based on the phase-difference between the receiver elements arranged in the vertical direction, a distance between the receiver elements arranged in the vertical direction, and the wavelength of the transmitting wave.

10. The direction detecting apparatus according to claim 1, wherein the transmitting wave generator generates the transmitting wave as a ultrasonic wave.

11. A direction detecting system comprising a plurality of direction detecting devices, each of the plurality of direction detecting devices including:

a transmitting wave generator for encoding a transmitting signal with a code having a high autocorrelation so as to generate a transmitting wave;

a transmitter for transmitting the transmitting wave;

a receiver including a plurality of receiver elements for receiving a reflected wave reflected by an object;

an orthogonal demodulator for orthogonally demodulating the reflected wave received by each of the receiver elements so as to generate a received signal;

a correlation-value calculating unit for calculating a complex correlation value between each of the receiving signals and the transmitting signal using the code;

a phase-difference calculating unit for calculating a phase difference between the complex correlation value calculated based on the reflected wave received by one of the receiver elements and the complex correlation value calculated based on the reflected wave received by another one of the receiver elements, a direction calculating unit for calculating a direction of the object based on the phase difference, a distance between the one of the plurality of receiver elements and the another one of the receiver elements, and a wavelength of the transmitting wave, wherein:

each of the correlation-value calculating units is capable of calculating the complex correlation values with all the codes used by each of the transmitting wave generators for generating the transmitting wave; and each of the correlation-value calculating unit calculates the complex correlation values with one of the codes.

* * * * *